US006322293B1

(12) United States Patent
Stephens

(10) Patent No.: US 6,322,293 B1
(45) Date of Patent: *Nov. 27, 2001

(54) METHOD FOR FILLING VOIDS WITH AGGREGATE MATERIAL

(76) Inventor: Patrick J. Stephens, 1276 Chuckanut Dr., Bellingham, WA (US) 98225

( * ) Notice: Subject to any disclaimer, the term of this patent is extended or adjusted under 35 U.S.C. 154(b) by 0 days.

This patent is subject to a terminal disclaimer.

(21) Appl. No.: 09/238,104

(22) Filed: Jan. 27, 1999

Related U.S. Application Data

(63) Continuation-in-part of application No. 09/015,374, filed on Jan. 29, 1998.
(60) Provisional application No. 60/036,174, filed on Jan. 29, 1997.

(51) Int. Cl.$^7$ .................................................. C09K 17/10
(52) U.S. Cl. .............................. 405/267; 405/266; 299/11
(58) Field of Search ..................................... 405/263, 266, 405/267; 166/292, 299; 299/11

(56) References Cited

U.S. PATENT DOCUMENTS

| 4,419,135 | * | 12/1983 | Hoge | 106/678 |
| 4,466,833 | * | 8/1984 | Spangle | 106/602 |
| 4,786,211 | * | 11/1988 | Leutner et al. | 405/264 |
| 5,494,514 | * | 2/1996 | Goodson et al. | 405/166 X |
| 5,601,752 | * | 2/1997 | Jenkins | 252/321 |
| 5,803,596 | | 9/1998 | Stephens . | |
| 5,803,665 | | 9/1998 | Stephens . | |
| 6,046,255 | * | 4/2000 | Gray et al. | 523/218 |

FOREIGN PATENT DOCUMENTS

1337421 * 11/1973 (GB) .

* cited by examiner

Primary Examiner—David Bagnell
Assistant Examiner—Sunil Singh
(74) Attorney, Agent, or Firm—Todd N. Hathaway

(57) ABSTRACT

A method for filling a void using an aggregate material, such as mine tailings, the fill material being pumped from a site which is located remote from the void. A fluid, aerated material is formed by mixing the particulate solid material with finished foam. The aerated material may also include cement or another binder for applications requiring structural strength. The bubble structure which results from incorporating the foam constituent in the fill material renders this much more fluid and pumpable, thereby allowing the use of much higher solids-to-water ratios than would otherwise be possible while still being able to pump the material over significant distances. This reduces the possibly of fluidic collapse of the material in the void, and produces other advantages as well.

11 Claims, 2 Drawing Sheets

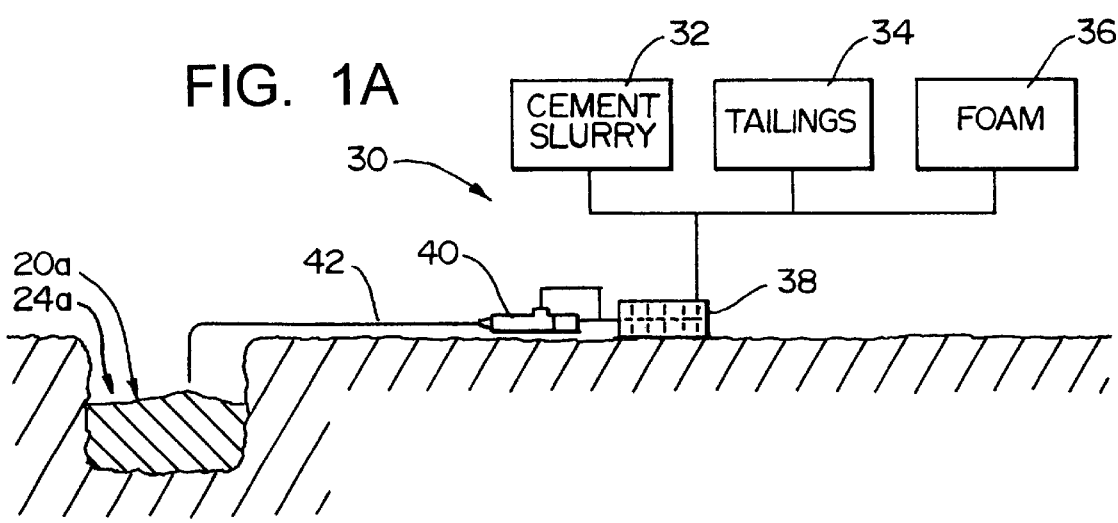

METHOD FOR FILLING VOIDS WITH AGGREGATE MATERIAL

RELATED CASES

This is a continuation-in-part application of patent application Ser. No. 09/015,374, entitled "Backfilling Underground Voids", filed Jan. 29, 1998, which is based on Provisional patent application Ser. No. 60/036,174, entitled "Backfilling Underground Voids", filed Jan. 29, 1997.

BACKGROUND (i) Field of the Invention

This invention relates generally to methods for filling voids with particulate or aggregate material such as crushed rock or gravel, and, more particularly, to an improved method for filling below- and above-ground voids using tailings and similar aggregate materials produced in mining and similar operations.

(ii) Related Art

A number of mining, excavation and construction operations require the deposition of large amounts of aggregate material in some form of cavity or void.

For example, mining operations ordinarily involve removal of ore-bearing rock or earth from a geological formation, thus creating one or more voids in the formation. The excavated rock is typically crushed and processed to extract the ore, leaving the crushed rock residue as tailings. If left unconfined above ground, the massive amounts of tailings produced by a typical mining operation present serious space and environmental problems. However, the tailings are commonly returned into the mine to backfill the voids which have been formed in the underground formation, while in other operations they are deposited in an above-ground pit or holding area.

For example, it is common to mine underground by forming a vertical lift shaft or helical tunnel and then to mine horizontally extending tunnels at different levels. Large volumes of ore are then removed via the horizontal tunnels by blasting a succession of stopes or underground voids upwardly from the far end of each tunnel back toward the center axis. In order for safe mining to proceed it is necessary to backfill each underground void or stope formed as part of the blasting and ore evacuation procedure, so as to support the "roof" above the stope and thereby allow an immediately adjoining volume of ore to be blasted without danger of collapse.

The backfilling is typically carried out by mixing a suitable particulate solid material, usually the mine tailings, with cement and water, and then conveying, trucking or pumping the backfill mixture to the location of the void. Excess water draining from the backfill mixture must be pumped from the mine and the backfill mixture allowed to set to form a solid fill in the stope.

The cost of backfilling is significant and can be as much as 20% of the total cost of the mining operation. The cost of backfilling is directly related to the cost of the cement content in the filling mixture but a significant cost is also involved in transport of the material to the void. The most convenient way of transporting the material to the void is by pumping through pipes but this requires a high water content in the backfill mixture. This is particularly the case with many mine tailings, due in part to the high void content which results from the comparatively uniform aggregate size of the crushed rock.

A conflicting requirement is that, in order to avoid mud slides underground (i.e., the fluidic collapse of part of the backfilled material) the recommended percentage of solids in the fill is above 74%. It is often difficult to pump such a mixture (at this ratio of solids) significant distances, but any increase in water content to improve pumpability increases the risk of mud slides and increases the volume and expense of cement required in the mix to in order for this to cure and reach specified strengths, which are typically in the order of 1 MPa. The amount of cement varies according to the backfill material and the water content but is usually around 6% in order for the fill to reach the required strength.

In some types of mining operations, the tailings are not used to backfill the mine as described above, but are instead deposited above-ground in a large pit or similar containment area. The process is essentially similar to that described above, except that in the absence of a requirement for structural strength the cement or other binder component may be eliminated. The large amounts of water which are required in order to pump the material continue to present serious problems, however, even in an above-ground placement. For example, dams, retaining walls or similar structures must often be provided to prevent mudslides and spills. Moreover, the water often becomes highly contaminated from contact with the tailings (whether from naturally-occurring minerals or from chemicals used in the ore extraction process), with the result that the use of large volumes of water to place the tailings leads to a serious problem containing and treating the water itself.

It is therefor desirable to be able to provide an aggregate fill material which is easy to pump and therefore economic to place, without requiring the high water content which increases the risk of mud slides or which requires a high cement content, which in turn increases the cost of the operation. Such filling material is desirable for use in a wide variety of mining situations, such as, for example, stope fill, the filling-in of disused mines to remove hazardous threats from cave-ins in subsequent open cast mining operations, and other similar situations. Moreover, such filling material is desirable for use in a wide range of other mining and non-mining operations, both above and below ground.

SUMMARY OF THE INVENTION

The present invention therefore provides a method for filling voids with an aggregate material, in mining or other operations, said method comprising the steps of forming a fluid filling material by mixing particulate solid material with a fluid foam material in an amount sufficient to form a pumpable aerated slurry, flowing the aerated slurry into the void, and allowing the slurry to set therein. The particulate solid material may comprise mine tailings.

The fluid foam material may comprise a mixture of a binder and foam. The binder may be a hydraulic cement. The foam may be formed from water and frothing agents.

Preferably the step of flowing the aerated slurry into the void includes pumping the slurry from the point of mixing to the void.

The step of flowing the aerated slurry into the void may further comprise the step of applying a defoaming agent to the slurry so as to collapse the foam therein when the slurry is in the void. The step of applying the defoaming agent to the aerated slurry may comprise the step of mixing the defoaming agent with the slurry as the slurry is injected into the void.

BRIEF DESCRIPTION OF THE DRAWINGS

FIG. 1A is a diagrammatic, cross-sectional, elevational view, similar to FIG. 1, showing filling of an above-ground void in accordance with the present invention.

DETAILED DESCRIPTION

Notwithstanding any other forms that may fall within its scope, one preferred form of the invention will now be described by way of example only with reference to the accompanying drawings, which show a typical mining operation in which the present invention may be used. The voids in the illustrated example are underground, but in other instances the void may be an above-ground containment area.

As used in this description and the appended claims, the term "void" includes all forms of cavities, pits, openings and the like, whether above or below ground, and whether a man-made or natural formation. Moreover, while the example described below is directed to the disposition of tailings which are in essence a "waste product" of the mining operation, it will be understood that the present invention is also applicable to the pumping and placement of aggregates which have been provided for the express purpose of providing fill in a selected area or constructing an engineered structure.

Figure 1:
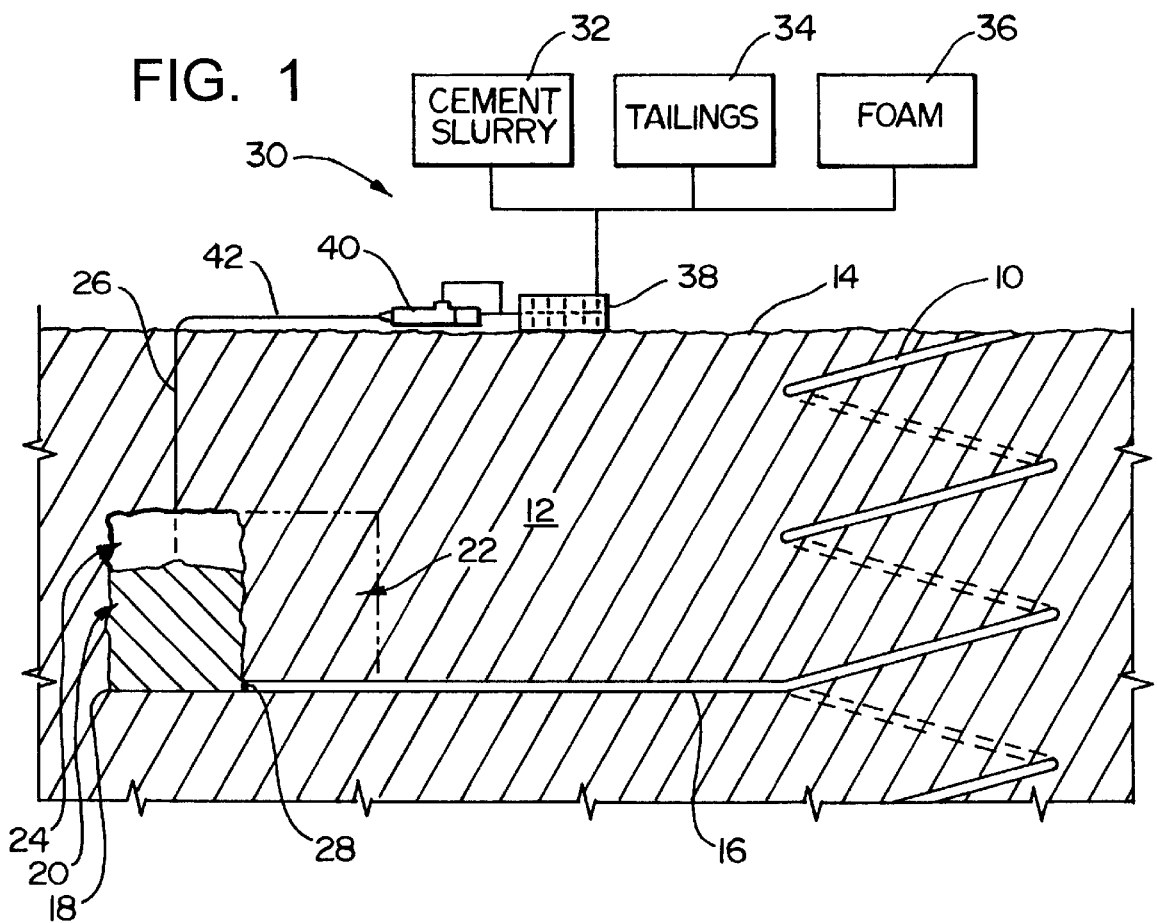
FIG. 1 is a diagrammatic, cross-sectional, elevational view showing the backfilling of an exemplary mine stope in accordance with the present invention.

In a typical mining operation in which the present invention may be used, and as can be seen in FIG. 1, a vertical access, which may be for example a lift shaft or a helical tunnel 10, is mined into the earth 12 from the surface 14. At the required depth, or at various intervals, horizontal tunnels 16 extend outwardly from the axis shaft 10 to their remote ends 18. To mine a body of ore an area 20 above the end of the tunnel 18 is drilled and explosives placed and detonated to collapse the ore material within the area 20 so that it falls into the tunnel 16 and can be removed by well known mining techniques.

In order to proceed with the mining operation by next blasting and collapsing the adjacent area 22, it is first necessary to fill the empty void 24 formed by the collapse and removal of material from the area 20 (the void 24 is commonly referred to as a "stope" in the particular form of mining operation which is shown in FIG. 1). This may be conveniently carried out by drilling a small access hole 26 from the surface 14 into the upper portions of the stope 24, and blocking the tunnel at the point 28 (where it enters the stope) in a suitable manner.

Backfilling material is then prepared according to the present invention by mixing a suitable particulate material (typically, the mine tailings resulting from processing the ore removed from the mine) with an aerated slurry in a mixing apparatus 30. In many embodiments the slurry will include a predetermined amount of binder, such as portland cement. The aerated slurry is suitably formed by mixing the binder with finished foam, which is typically formed from suitable frothing agents; in those embodiments where no binder is used, the aggregate may be mixed with the finished foam itself.

As is shown schematically in FIG. 1, the apparatus preferably includes components for supplying the binder, such as cement slurry 32, tailings or other particulate material 34, and foam 36, and for feeding these into a mixer 38.

The binder component may be any suitable material for binding the aggregate following placement, including Portland cements and other hydraulic cements, slag cements, Type-C fly ash cement and other fly ashes, as well as suitable non-hydraulic binders. The tailings or other solid material, in turn, may be crushed if necessary to provide the particulate constituent; due to the presence of the foam component, however, the grading of the aggregate or other particulate will not normally be critical.

The foam component, in turn, may be provided by any suitable foam material or foaming/frothing agent, such as the various aqueous and non-aqueous foam materials and chemical foaming agents which are known to those skilled in the relevant art. Aqueous foam materials, which are generally preferred because of their economy, consistency, and ease of use, are typically formed by mixing a liquid foam concentrate material (suitable examples of foam concentrate material include "Mearl Geocell Foam Liquid", available from The Mearl Corporation, Roselle Park, N.J., along with similar products available from Elastizell Corporation, Ann Arbor, Mich., and other suppliers) with water to form a foam solution, and then mixing the foam solution with air to form a finished foam having a stable bubble structure (suitable foam generators of this type may be obtained from The Mearl Corporation and from Pacific International Grout Company, Bellingham, Wash.). A suitable apparatus for generating large amounts of foam material for mixing the slurry is also available from Pacific International Grout Company, and is described in U.S. Pat. No. 5,803,596, which is hereby incorporated herein by reference.

In some embodiments it may be desirable to configure the feed mechanisms so as to enable the operator to control the amounts and relative proportions of the constituents as these are being fed into the mixing apparatus; for example, the relative proportions of cement slurry and foam solution may be controlled using variable-speed metering pumps, and the tailing particulate may be fed from a hopper using a controllable speed conveyor or rotary metering valve.

It will be understood, however, that any suitable feed and mixing mechanisms may be used in carrying out the present invention, and the choice of mechanisms will depend to a significant degree on the form in which the fill constituents are supplied. For example, FIG. 1 shows mixer 38 as a horizontal paddle mixer, which may provide certain advantages where the cement is already in slurry form and the foam constituent is added as a finished aqueous foam. In other embodiments, however, the mixing of water and cement dust may be performed in the mixer itself, and the foam component may be supplied as a dry or liquid chemical frothing agent which is combined with water either in or before entering the mixer. Accordingly, a vertical tub mixer or other form of mixer may be preferred in some embodiments.

Similarly, FIG. 1 shows the system as incorporating a large positive-displacement, progressive cavity, screw-type pump, of the type which are available under the trademark Moyno™ from Robbins & Meyers, Dayton Ohio, which has several advantages (including efficiency, precise control of the pumping rate, and avoiding damage to the bubble structure in the aerated fill material), but again it will be understood that any suitable type of pump may be employed in this role.

The resultant fluid filling material contains a large amount of entrained air by virtue of the foam component. As can be seen in FIG. 1, this is flowed from the mixer 38 into the void 24, e.g., by using the pump 40 and pipe 42. The void may be an underground stope 24 as described above, or an above-ground containment area 24a as shown in FIG. 1A.

It has been found that by using an aerated slurry (as opposed to a conventional water-aggregate slurry), the bubble structure in the fill material renders this significantly more fluid and pumpable than a conventional mixture of water and particulate solid material, and therefore relatively easy to pump over long distances using the pump 40 and pipe 42, even when the percentage of solids in the fill is kept above the minimum required to avoid the risk of mud slides in the stope 24. Moreover, where cement is used in the mix, the comparatively low water content of the aerated slurry makes it possible to use much less cement as compared with the unfoamed materials; for example, to achieve a comparable strength, approximately 4.5 to 5% cement is now required compared with at least 6% when foam is not used.

The additional expense of the foam, both in the mixing process and in the frothing agents, is more than off-set by the decrease in cement quantities (by reducing the water content), improvements in pumpability, increase in overall volume, and increase in the percentage of solids in the mix.

Although the examples described above note the advantages of the present invention when the fill material contains cement, it will be understood that in some applications the fill material of the present invention may contain little or no cement or other binder. For example, if there is no requirement that the fill have any significant structural strength, the fluid fill material may essentially comprise aggregate (e.g., crushed rock) and finished foam alone. Hence, depending on the application and the specifications for the particular job, the cement or other binder component may be nil or may be sufficiently high to react with the water component and provide the fill with maximum available strength when cured.

The amount of foam required, i.e., the ratio of foam to solids, will vary somewhat depending on the size and coarseness of the particulate (e.g., the crushed tailings), the shape of the particulate, the stability of the foam material which is being used, the distance over which the material is being pumped, and other factors to be determined for the particular job. From a practical standpoint, however, the amount of water which is added to the fill by the foam component will always be far less than the amount of water which would be required to render the particulate pumpable without the foam; for example, in testing applicant has found that the amount of water contained in the foam needed to render crushed tailings pumpable is roughly 1 to 18 as compared to water without foam.

The aerated slurry may be flowed directly into the void and allowed to cure without further treatment, as shown in FIG. 1. In many applications, however, it is desirable to collapse the bubble structure of the material once it has entered the void and pumpability is no longer required. For example, in the case of a mine backfill operation there is usually a large volume of tailings to be disposed of and only a limited amount of void space within the mine to hold them. Even in above-ground placement, a reduced final volume generally allows for a smaller, more economical containment area.

Figure 2:
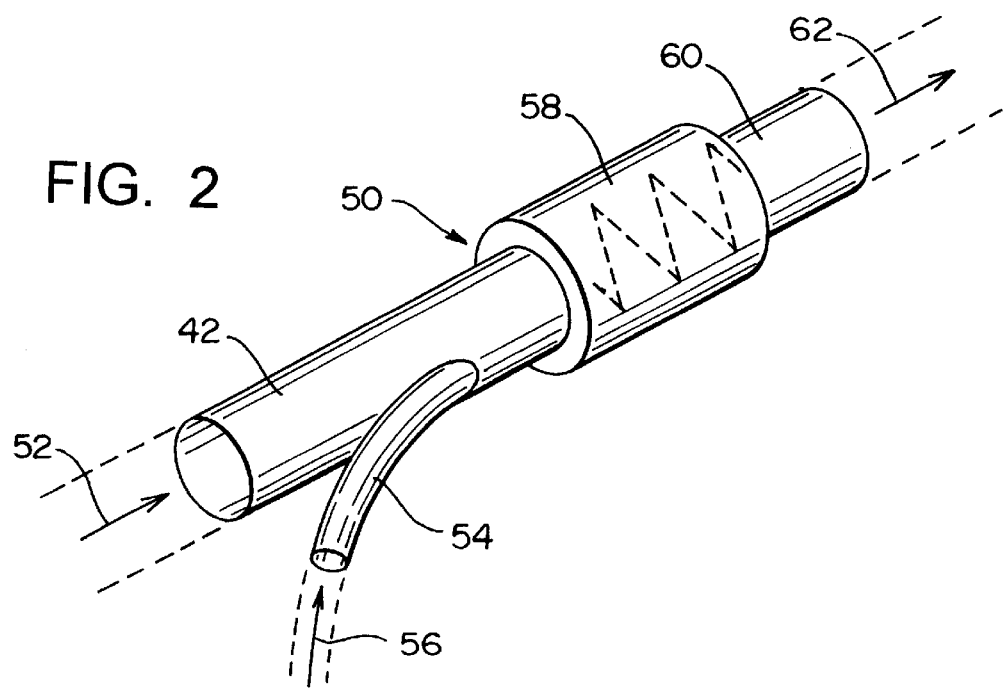
FIG. 2 is a perspective, somewhat diagrammatic view of a nozzle assembly for mixing a defoaming agent with the aerated slurry as the slurry is injected into a void.

In order to collapse the bubble structure of the fill material, a suitable "defoaming" agent can be added to the fluid material at the injection point, as it is discharged into the void. For example, FIG. 2 shows a nozzle assembly 50 by which a defoaming agent is added to the fill material immediately before it enters the void.

As can be seen, the nozzle assembly 50 is mounted to the discharge end of conduit 42 so as to receive the flow of the aerated slurry therefrom, as indicated by arrow 52. The defoaming agent is fed into the nozzle assembly in liquid form, via a secondary conduit 54, in the direction indicated by arrow 56. For purposes of efficiency the defoaming agent can be fed to the nozzle assembly at a metered rate which corresponds to the rate of flow of the aerated fill; an example of an apparatus suitable for providing an additive to a discharge nozzle at such a metered rate is described in U.S. Pat. No. 5,803,665, which is hereby incorporated herein by reference.

The defoaming agent is mixed with the fill material by a static mixer 58 which is mounted in the assembly downstream of the secondary conduit 54, and the mixed material is discharged from this into the void though an output pipe 60, in the direction indicated by arrow 62.

The defoaming agent, having been mixed with the fill material, collapses the bubble structure very rapidly once the material has been deposited, without interfering with the pumpability of the fill material upstream of the nozzle assembly. It will be understood, however, that the relationship of the components shown in FIG. 2 is illustrative of one exemplary embodiment only. For example, the static mixer may not be present in all embodiments, and the line for adding the defoaming agent may be attached further up the main conduit 42 so that mixing simply takes place inside the conduit itself. Furthermore, the defoaming agent line may simply discharge into the mass alongside the end of the main conduit, or may applied to the fill material after it has been deposited in the void, using a separate line or vessel.

Although the amount of defoaming agent required will vary depending on the actual composition and operating conditions, in general only a very small amount is needed to completely collapse the bubble structure. While any suitable defoaming agent which effectively collapses the bubble structure may be employed, silicone oils and other silicone-based defoaming agents are generally preferred because of their good initial action, quick knock-down, and effectiveness within wide ranges of pH; one example of a silicone-oil defoaming agent is "ANTIFOAM-A", available from Dow-Corning. Other suitable defoaming agents, some of which are limited in effectiveness to certain pH ranges, include fatty amid-based products (e.g., "NOPCO 198" available from Diamond Shamrock), fatty acid-based products (e.g., "NOPCO KF", available from Diamond Shamrock), and fatty ester and hydrocarbon wax-based products (suitable examples of which are also available from Diamond Shamrock).

Because the defoaming agent eliminates the bubble structure upon or shortly after placement of the fill material, the operator can add however much foam is needed to ensure pumpability of the material, without concern about increasing the final volume at the receiving end. The relatively small amount of water which is released when the bubbles collapse can serve to hydrate the cement or other aqueous binder when this is present in the mix. The result is a dense fill in the void having very little greater volume than the volume of tailings or other particulate which was initially incorporated in the fill. Moreover, there is little or no excess water which must be removed, treated, or otherwise dealt with at the placement site.

It is to be recognized that various alterations, modifications, and/or additions may be introduced into the constructions and arrangements of parts described above without departing from the spirit or ambit of the present invention as defined by the appended claims.

What is claimed is:

1. A method for filling an underground mine void, said method comprising the steps of forming a fluid, aerated fill material by mixing:

milled mine tailings in an amount sufficient that said fill material has a solids content of 74% or greater; and stable bubble foam material for maintaining fluidity of said fill material when flowing under pressure through an elongate conduit for extending a predetermined distance from a remotely located site to said void;

flowing said fluid, aerated fill material from said remotely located site into said void through said elongate conduit; and collapsing said foam material in said fill material when said fill material is in said void.

2. The method of claim 1, wherein the step of forming said fluid, aerated fill material comprises the step of:

mixing a binder material with said mine tailings and foam materials so as to provide said fill material with a desired compressive strength upon setting.

3. The method of claim 2, wherein the step of mixing a binder material with said mine tailings and foam materials comprises:

mixing a hydraulic cement material with said mine tailings and foam materials.

4. The method of claim 3, wherein the step of collapsing said foam material comprises:

mixing a defoaming agent with said aerated fill material as said fill material is flowed into said void.

5. The method of claim 1, wherein the step of forming said fill material further comprises the step of:

mixing a frothing agent with water to form said foam material.

6. The method of claim 1, wherein the step of forming said fill material further comprises the step of:

mixing an aqueous foam solution and air to form said foam material.

7. The method of claim 1, wherein the step of forming said fill material further comprises the step of:

forming said fill material at said site which is located remote from said void.

8. The method of claim 1, wherein the step of flowing said fill material into said void comprises:

pumping said aerated fill material into said void.

9. The method of claim 1, wherein the step of collapsing said foam material comprises:

mixing a defoaming agent with said aerated fill material as said fill material is flowed into said void.

10. The method of claim 9, wherein said defoaming agent is a silicone oil-based defoaming agent.

11. The method of claim 1, wherein said underground void is a mine stope.

* * * * *